Patented May 3, 1932

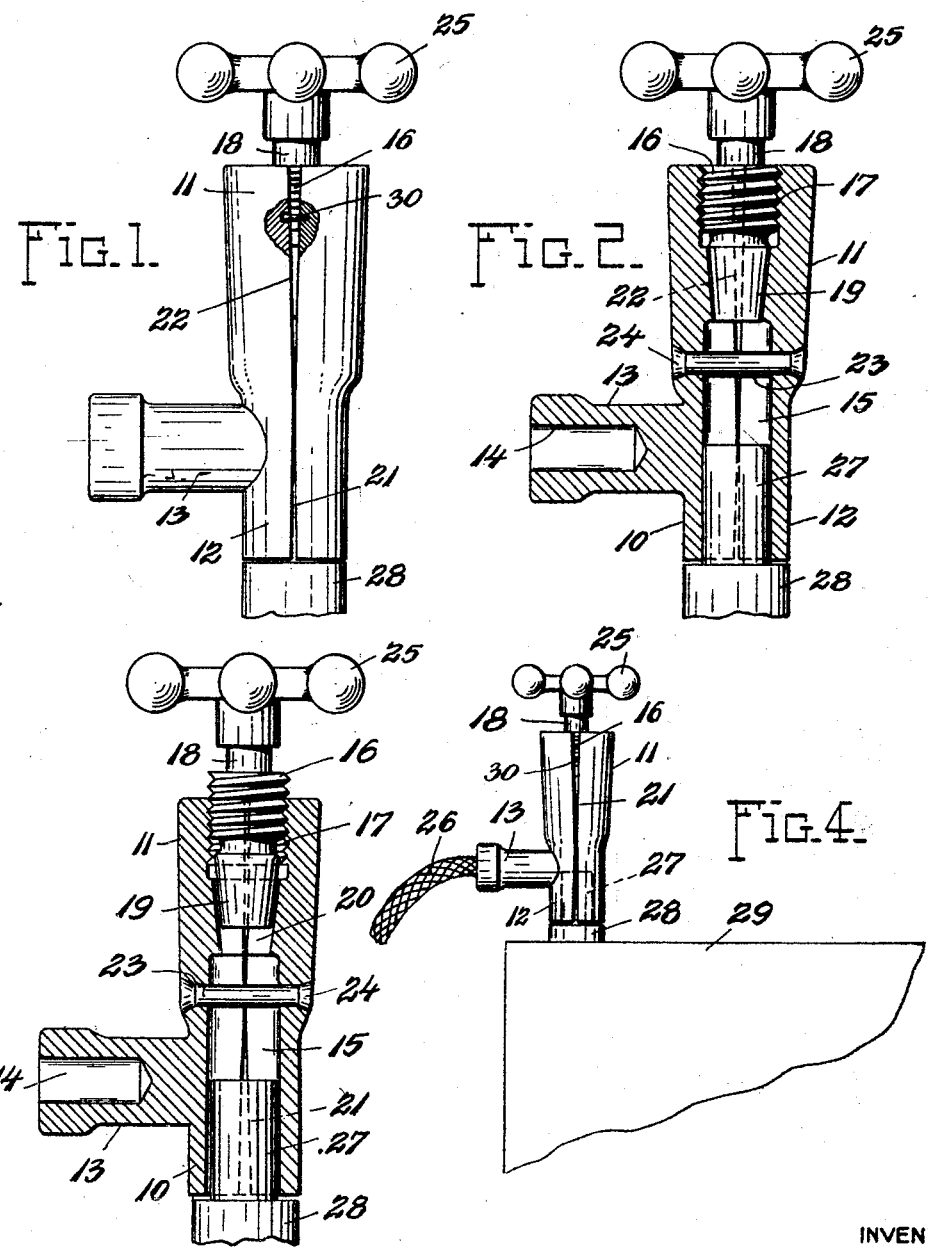

1,857,121

UNITED STATES PATENT OFFICE

OTTO M. LADE, OF CLEVELAND, OHIO

TUBULAR CLAMP

Application filed May 24, 1929. Serial No. 365,706.

My invention relates to tubular clamps, and especially to split tubular clamps adapted to be secured upon the end of a battery element or other outwardly extending plug by a manually operated screw. It is an object of my invention to provide a tubular clamp of the T-form in which the alined tubular portion for clamping has tubular half sections, each of which is semi-circular in cross section, the two sections being held together by a cross pin extending through the center of the combined tube to serve as a fulcrum, and the contacting edges of the two sections being slightly convex in the direction of the length of the tube, so that the two half sections will rock slightly about the fulcrum, whereby expanding one end of the half sections will clamp the other ends together.

It is a further object of my invention to provide a split tubular clamp having a cross tube integral with one section of the clamp but the cross tube having no tubular communication with the inner chamber of the clamp portion, the opening in the cross tube forming merely a socket for insertion of a conductor or other member desired to be attached therein.

Other and further objects and advantages of the invention will be hereinafter set forth by descriptive details in the specification and by illustrations in the accompanying drawings, in which—

Figure 1 is a side elevation of my tubular clamp shown in clamped condition;

Figure 2 is a central vertical section of my clamp under the same conditions;

Figure 3 is a similar view showing the expansion plug raised to release the clamp, and Figure 4 is a side elevation on a smaller scale than the other views, of the device clamped to an element of a battery, and carrying a conductor secured in the lateral socket member.

My clamp is here shown as a unitary integral metal T-member 10 usually comprising alined tubes 11, where power is applied in attaching the clamp to some projecting portion, and 12 which is a reduced end of the tube which is adapted to fit over a plug which may be either solid or tubular. The lateral extension 13 of the T will have the usual tubular opening 14 but which does not communicate with the inner cylindrical chamber 15 of the alined members.

The device is operated by a threaded cylinder portion 16 entering a socket 17 of similar size and shape in the upper end of the tube 11. Below the part 16 the stem 18 bears a frusto-conical wedge portion 19 adapted to fit neatly and axially in the opening 20 which connects the chamber 15 with the socket 17. Evidently, a downward thrust of the wedge 19 will have a strong expansive force applied against the walls of the tube 11. To produce my clamping function, I have split the combined tube 11 and 12 in a central longitudinal plane at right angles to that of the extension 13.

The edges of the combined tube 11 and 12 are somewhat convex at 21 and 22, as shown in all the views, to cause a slight rocking movement of the halves of the combined tube on such edges, so that expansion of the ends of such halves by the inward thrust of the wedge 19 will result in clamping the ends opposite socket 17, about any inserted member which may be a projecting plug or end of a battery element, such as is generally used in motor cars or in radio cells. The two halves or half sections of the combined tube 11 and 12 have an intermediate fulcrum by the provision of a transverse pin 23 which crosses the inner chamber 15, as shown in Figs. 2 and 3, and whose ends 24 are secured in the walls of the tube by welding, or brazing, or other positive means. This fulcrum pin 23 is parallel with the tube 13. Dowel pins 30 welded in one of the convex edges, as 22, of one of the halves of the tube 11, fit sockets in the opposite edge of the other half of this tube and guide the halves of the combined tube 11 and 12 in their movement, and sufficient flexibility exists in such pin 23 to permit essential rocking in the plane of the tube 13.

Any suitable actuating member, such as a wheel 25, may be used to rotate the stem 18 and the parts 16 and 19 carried thereby. The opening 20 will, of course have substantially the same form as the wedge member 19 entering it. The opening or socket 14 will receive an end of conducting member 26 which will ordinarily be brazed or otherwise fixedly secured therein, so that unclamping the tube 10 from the plug 27 of a battery element 28, makes possible the ready removal of the entire device 10 and 13 from the plug which may project slightly above the wall of the usual battery jar, whose character or form is not especially concerned in the present invention. The conductor 26 may be either flexible or may be a rigid bar, the end thereof being adapted to the socket 14 to receive it, the latter being easily shaped to the particular conductor on which it will be used. In any case, however, when the conductor 26 is to be disconnected from the plug 27, it is only required to unclamp the tube 10 from the plug 27, and lift parts 10 and 26 off together.

In operation, the conductor 26 is usually brazed in the socket 14 before the clamp 10 will be attached to the plug 27. If now, the battery 29 has been recharged, or otherwise prepared for connection with the line on which it is to be used, the shaft 18 will be rotated to unscrew the cylinder 16 and thereby lift the member 19 out of its socket 20, and thereby permit the sections of the tubes 11 and 12 to take their normal relative position as shown in Fig. 3 in which the lower tube 12 is loosened from the plug 27. The clamp 10 may now easily be applied to the plug 27 over which it fits easily, and the wheel 25 with its shaft 18 is now rotated to drive the member 19 down into the chamber 20 thereby expanding the tube 11, while guided by the dowel pin 30, and clamping the split tube 12 to the plug 27 in the manner shown in Figs. 1, 2 and 4.

The movement of the tubular sections relative to each other about the fulcrum pin 23 is very slight, but the clamping action is very strong, because of the great mechanical advantage of the construction disclosed. The clamping action is therefore very positive, though requiring very little power to operate the screw 16 to drive the wedge 19.

It will be understood that the member 13 is not essentially a socket, and not essentially integral with the parts 11 and 12, but that some laterally extended part securely attached to the clamp portion will be needed, and that it is desired that the conductor shall be attached to such lateral part. Other modifications may also be used without departing from the spirit of the disclosed invention or the scope of the appended claims.

Having thus described my invention what I claim, therefore, as new and useful and desire to secure by Letters Patent, is:—

1. A clamping device comprising a continuous tube split into approximate halves longitudinal of the tube pivotally connected together intermediate their ends with contacting edges abutting each other and slightly separated normally at their ends, an intermediate fulcrum pin comprising a transverse pin whose ends are brazed or welded in the tube, said fulcrum pin being parallel with the tube and sufficient flexibility exists in such pin to permit essential rocking in the plane of the tube, and means for insertion in one end of the tube whereby the opposite ends of said halves will be forced together at the opposite ends.

2. A clamping device comprising a continuous tube split into approximate half sections longitudinal of the tube connected together intermediate their ends with contacting edges and slightly separated normally at their ends, the contacting edges of said sections being slightly convex as viewed longitudinally, so that contacting the edges at one end will separate the edges of the other, a fulcrum pin securing the two sections together by having its ends rigidly secured to the respective sections, and means for insertion in one end of the tube whereby the ends of said sections will be forced together at the opposite end.

3. A clamping device comprising a continuous tube split into approximate half sections longitudinal of the tube connected together intermediate their ends with contacting edges and slightly separated normally at their ends, the contacting edges of said sections being slightly convex as viewed longitudinally, so that contacting the edges at one end will separate the edges of the other, a socket member extending laterally from one of said sections and adapted to receive the end of a conductor therein, a fulcrum pin securing the two sections together by crossing the opening in the tube and having its ends rigidly secured to the respective sections at points intermediate their ends, and wedge means for insertion in one end of the tube whereby the ends of said sections will be forced together at the opposite end.

4. A clamping device comprising an elongated hollow member split into approximate halves longitudinal of the member, pivotally connected together intermediate their ends with contacting edges, and slightly separated normally at their ends, the contacting edges of said sections being slightly convex as viewed longitudinally, so that contacting the edges at one end will separate the edges of the other, and means for axial insertion in one end of the hollow member whereby the opposite ends of said halves will be forced together.

5. A clamping device comprising a continuous tube split into approximate halves longitudinal of the tube pivotally connected together intermediate their ends with contacting edges, and having normally slightly separated edges at their ends to permit movement of said halves in a rocking manner upon said pivotal connection, guiding means for such rocking movement comprising a dowel pin secured to an edge of one of the halves and loosely movable in a socket in the other, the contacting edges of said sections being slightly convex as viewed longitudinally, so that contacting the edges at one end will separate the edges of the other, and means for insertion in one end of the tube whereby the opposite ends of said halves will be forced together.

6. A clamping device comprising a continuous tube split into approximate half sections longitudinal of the tube connected together intermediate their ends with contacting edges and slightly separated normally at their ends, the contacting edges of said sections being slightly convex as viewed longitudinally, so that contacting the edges at one end will separate the edges of the other, an intermediate fulcrum pin securing the two sections together by having its ends rigidly secured to the respective sections, means to guide the said half sections in their rocking movement to vary the distance between their edges in a common plane, and means for insertion in one end of the tube whereby the opposite ends of said sections will be forced together.

7. A clamping device comprising tubular sections connected together intermediate their ends with contacting edges to form a common split tube, the edges of the section being normally slightly separated at their ends, the contacting edges of said sections being slightly convex as viewed longitudinally, so that contacting the edges at one end will separate the edges of the other, a fulcrum pin attaching the sections at the intermediate connection, means for guiding the sections in a common plane in their rocking movement on said pin and a wedge for insertion in one end, to force the opposite ends of the sections together.

8. A clamping device comprising a tubular member divided into approximate sections on a plane longitudinal and central of the tube, a socket member extending laterally from one of said sections and adapted to receive the end of a conductor therein, a fulcrum pin securing the two sections together by crossing the opening in the tube and having its ends rigidly secured to the respective sections at points intermediate their ends, the contacting edges of said sections being slightly convex as viewed longitudinally, so that contacting the edges at one end will separate the edges at the other, one end of the tubular member being internally threaded for a short distance and having a frusto-conical space adjacent the threads but between the latter and the pin, the smaller end of such space being nearer the pin, and a rotating actuating member having at one end a frusto-conical wedge to fit the said space and an externally threaded cylinder portion to engage the internal threads of the tube, whereby rotating the actuating member in the tube will expand the sections about the frusto-conical space and clamp the opposite end of the sections together beyond the pin.

9. A clamping device comprising a tubular member divided into approximate sections on a plane longitudinal and central of the tube, a socket member extending laterally from one of said sections and adapted to receive the end of a conductor therein, a fulcrum pin securing the two sections together by crossing the opening in the tube and having its ends rigidly secured to the respective sections at points intermediate their ends, the contacting edges of said sections being slightly convex as viewed longitudinally, so that contacting the edges at one end will separate the edges at the other, means for guiding the sections in their movement on said fulcrum pin, and a wedge element for insertion in one end of said tubular member to actuate the clamping function of the opposite end thereof beyond the pin.

In witness whereof I have hereunto set my hand this 21st day of May, A. D. 1929.

OTTO M. LADE.